United States Patent [19]

Witteles et al.

[11] 3,812,479

[45] May 21, 1974

[54] READ-ONLY-MEMORY WITH RADIATION SET THRESHOLD VOLTAGE

[75] Inventors: Abraham A. Witteles, Forest Hills, N.Y.; Harry Putterman, Elizabeth, N.J.

[73] Assignee: The Singer Company, New York, N.Y.

[22] Filed: Dec. 31, 1968

[21] Appl. No.: 789,054

[52] U.S. Cl. ........... 340/173 LS, 307/238, 307/279, 307/304, 340/173 R, 340/173 LM

[51] Int. Cl. ........................ G11c 11/40, G11c 11/42

[58] Field of Search ... 340/173 R, 173 LS, 173 LM; 307/238, 279, 308, 304; 250/219, 220

[56] References Cited

UNITED STATES PATENTS

| | | | |
|---|---|---|---|
| 3,508,211 | 4/1970 | Wegener | 340/173 R |
| 3,626,387 | 12/1971 | Terman | 340/173 LS |
| 3,201,764 | 8/1965 | Parker | 340/173 |
| 3,401,294 | 9/1968 | Cricchi | 340/173 X |
| 3,465,293 | 9/1969 | Weekler | 250/220 X |
| 3,488,636 | 1/1970 | Dyck | 340/173 |

OTHER PUBLICATIONS

Coppen, "FET Complementary Integrated Circuits: Aerospace Natural," Electronics, 12/28/64, pp. 55–59.

Lohman, "Some Applications of Metal-Oxide Semiconductors to Switching Circuits," SCP and Solid State Technology, 5/64, pp. 31–34.

Speth, Electron Beam Control of FET Characteristics, IBM Technical Disclosure Bulletin, Vol. 18, No. 4, pp. 638–639, Sept. 1965.

*Primary Examiner*—Bernard Konick
*Assistant Examiner*—Stuart Hecker
*Attorney, Agent, or Firm*—T. W. Kennedy

[57] ABSTRACT

An arbitrary pattern of "ones" and "zeros" is "set" or stored into a standard MOSFET wafer containing many individual transistors, by utilizing the radiation susceptibility of such devices. That is, by selectively irradiating individual MOS transistors to a sufficient level, their corresponding turn-on or threshold voltages may be caused to shift by a predetermined amount. Hence, when a voltage pulse is applied to the gates of the irradiated transistors they will not "switch on." In this manner, all irradiated transistors will store "zeros." Conversely, since the threshold voltages corresponding to all non-irradiated transistors remain uneffected they are turned on when gated in the usual manner, and are therefore adapted to store "ones." In order to erase the original stored program, the irradiated wafer is placed in an oven-heated environment which completely anneals all radiation effects thereby restoring the threshold voltages to their original value. The same wafer may then be re-irradiated to store a new and different pattern of "ones" and "zeros."

2 Claims, 6 Drawing Figures

INVENTORS
ABRAHAM A. WITTELES
HARRY PUTTERMAN
BY
ATTORNEYS

INVENTORS
ABRAHAM A. WITTELES
HARRY PUTTERMAN
BY
ATTORNEYS

INVENTORS
ABRAHAM A. WITTELES
HARRY PUTTERMAN
BY
ATTORNEYS

READ-ONLY-MEMORY WITH RADIATION SET THRESHOLD VOLTAGE

BRIEF SUMMARY OF THE INVENTION

The present invention relates generally to memory subsystems, and more specifically, to a Read-Only-Memory (ROM) for storing information in binary bit form as represented, for example, by a predetermined pattern of "ones" and "zeros." Conventional ROM's often comprise a series of MOS type transistors wherein each transistor stores a bit of information and operates in a manner analogous to that of a simple SPDT switch. That is, upon the application of a voltage pulse of proper polarity to the gate of an MOS transistor — negative in a p-channel device and positive in an n-channel device — a circuit path is established between drain and source and current flows between these two terminals provided the magnitude of the voltage pulse exceeds $V_T$, the threshold voltage of the device. It can be shown that if the oxide layer separating the gate from the substrate is made thick enough the gate voltage will be ineffective and current will not flow.

Thus, in the conventional method of preparing MOS-ROM's a relatively thin oxide layer is deposited between gate and substrate in the MOS transistors storing "ones" and a thick oxide layer is deposited between the gates and substrates of these transistors storing "zeros." Alternatively, discretionary wiring may be used to produce the discrete pattern of "ones" and "zeros." In either case once produced the stored pattern can never be changed without incurring the expense of a completely new array. At best then, prior art fabricated, MOS read-only-memories have only limited application inasmuch as they must be discarded each time the computer manufacturer and/or user wishes to alter the program stored therein.

In order to increase the versatility and cost-effectiveness of such memory arrays, the present invention contemplates a scheme whereby the original program may be stored in a standard MOS-ROM in a semi-permanent manner permitting the latter to be continuously reprogrammable and therefore reusable as often as desired.

Briefly stated, this is accomplished by exploiting the low radiation damage threshold of MOS devices, and their capability of recovery from such radiation damage when subjected to high temperatures. It has been found that the threshold voltage $V_T$ of an MOS transistor may be dramatically changed by exposure to various forms of radiation. Hence, on arbitrary pattern of "ones" and "zeros" may be "set" or stored into a standard MOS wafer by selectively irradiating individual MOS transistors to a level sufficient to cause a corresponding voltage shift in their $V_T$ characteristics. The voltage applied to the gates of the irradiated transistors is then insufficient to turn them on. The irradiated transistors consequently store "zeros" since they would not turn on when pulsed while all non-irradiated transistors in the wafer would store "ones." The changes in $V_T$, which were induced by exposure to radiation can be completely annealed by subjecting the wafer to a suitable combination of temperature and annealing time. Hence, the array can be reset thermally and then selectively irradiated again to store a different program.

These and other objects and advantages of the present invention as well as a complete and thorough understudy thereof will be made apparent from a study of the following detailed description of the invention in connection with the accompanying drawings.

DETAILED DESCRIPTION OF INVENTION

Figure 1:
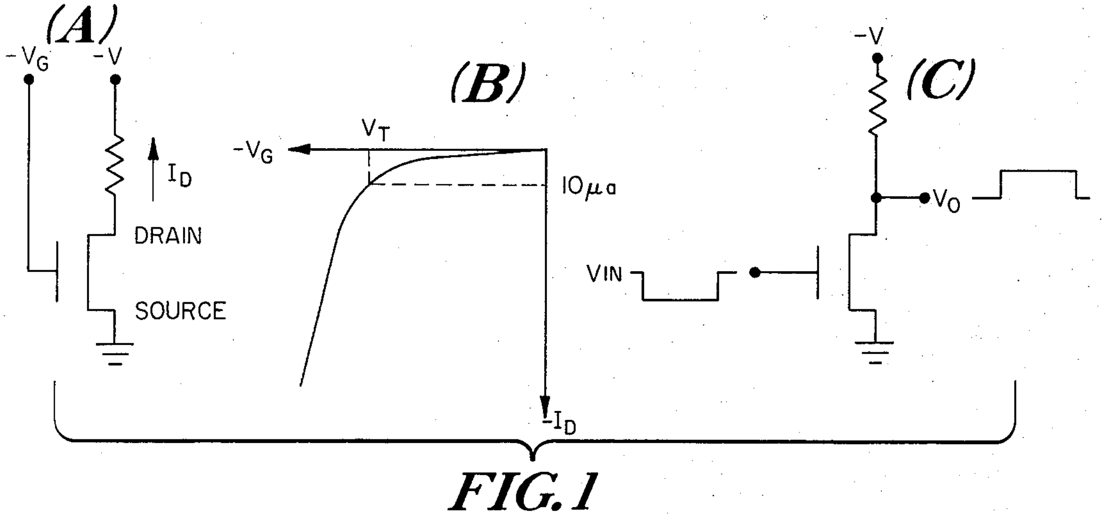
FIG. 1, parts A-C, illustrate various electrical characteristics inhering to conventional MOS transistors.

Referring now to FIG. 1, part A there is shown an electrical schmatic circuit for a typical field effect p type MOS transistor. When a suitable negative voltage $-V_g$ is applied to the gate, current $I_D$ will flow from source to drain as indicated. The transfer characteristic for this device is graphed in FIG. 1, part B and shows that conduction between drain and source is very small for negative gate voltages from zero to a value called the threshold voltage $V_T$, then increases rapidly for voltages more negative than the threshold voltage. When the input gate voltage is a negatively going pulse whose magnitude exceeds $V_T$, the voltage output of the device will be equal in magnitude and of opposite polarity as shown in FIG. 1 part C. Hence, the MOS transistor may function as a simple inverting logic switch having a "one" output when pulsed and a "zero" output when its input gate is low or not pulsed.

Figure 2:
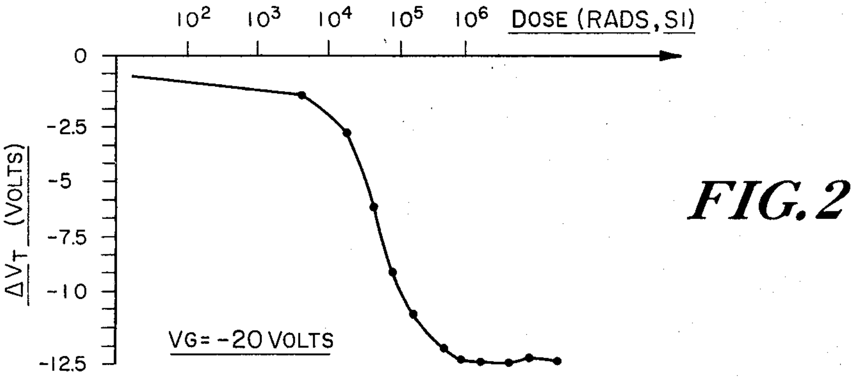
FIG. 2 is a graph showing the change in threshold voltage as a function of radiation dosage.

It has recently been found that MOSFET'S of the type described herein are extremely susceptible to radiation damage by neutrons, protrons, gamma rays, X-rays, and the like. The electrical parameter which is most effected by such radiation is the gate threshold voltage $V_T$ which suffers a substantial shift toward the negative for both positive and negative bias voltages. This effect is principally due to ionization and subsequent accumulation of positive charge in the oxide region which, in turn, effects the threshold potential. Thus, for example, FIG. 2 graphically shows the resultant shift in $V_T$ experienced by a typical commercially available MOS device in a radiation environment consisting primarily of gamma rays from the isotope Cobalt 60. The gate bias was −20 volts during irradiation. Note that with a dosage of approximately $10^6$ rads (Si), the threshold voltage change $\Delta V_T$ is approximately 12.5 volts.

In accordance with the principles of the present invention, it is intended to utilize the above described radiation effect as the mechanism for storing a predetermined pattern of "ones" and "zeros" into a standard MOS wafer which itself may contain as many as, say, 10,000 individual MOS transistor units or devices. By selectively irradiating individual MOS transistors on the wafer, their corresponding threshold voltages will be caused to shift sufficiently enough to prevent them from being turned on when gated by an input pulse. The irradiated transistors would, thus, be storing "zeros" while all others would store "ones."

Figure 3:
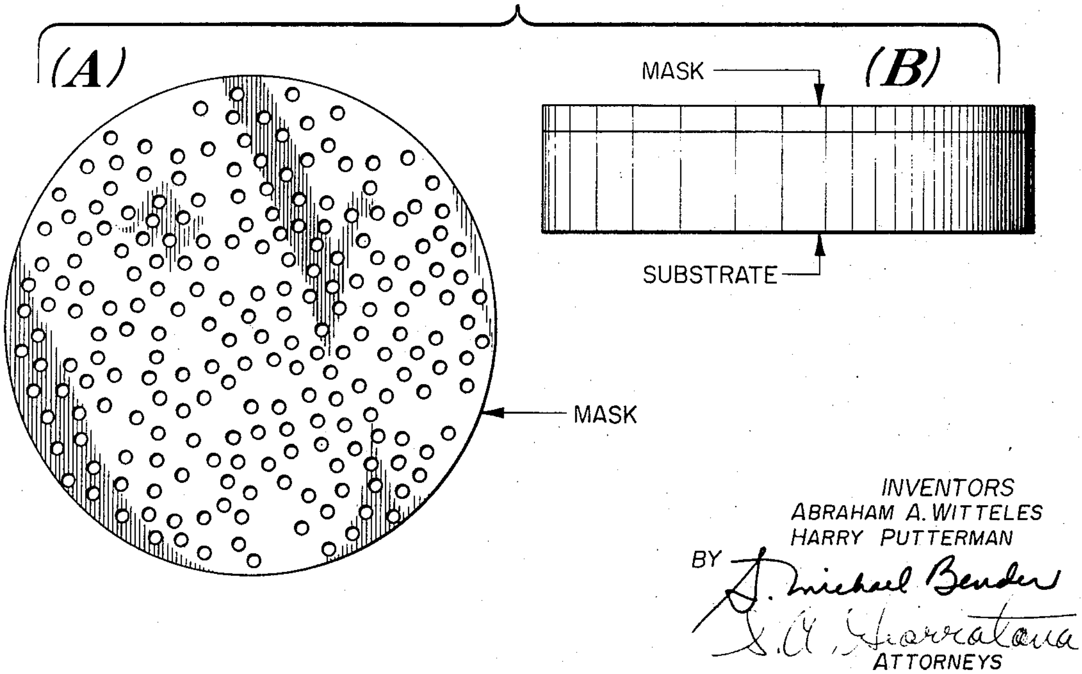
FIG. 3 illustrates a radiation shielding mask.

Irradiation may be accomplished in either of two ways. In the first preferred method, a standard MOS wafer is placed on an indexing machine and using an X-ray generator with a well collimated beam the individual transistors are serially irradiated with a dose of approximately 10,000 rads or more. Since this will require that the indexing machine move the wafer a certain number of indices after a particular transistor is irradiated, it is contemplated that the exact amount of wafer displacement will be programmed automatically by a tape connected to the indexer. Instead of selectively irradiating individual transistors one at a time, an apertured steel mask which preferably is at least one-eighth inch thick may be prepared to cover the wafer with a predetermined storage pattern punched or drilled out as shown in FIG. 3. Thus the one-eighth inch steel plate will cover all those transistors whose characteristics are not to be changed, that is, those storing "ones" while those transistors directly underneath the mask where the correct transistor dimensions have been punched out will be exposed to the full radiation dose and will suffer a significant threshold voltage shift, permitting then to store "zeros." In the latter method therefore all the transistors participating in the memory storage are irradiated simultaneously in one exposure which affects all the exposed transistors but which does not change the transistors covered by the mask.

In connection with the use of the mask illustrated in FIG. 3, the most efficient way of supplying the MOS wafer with the required 10,000 rads (Si) would be through utilization of an X-ray unit such as Picker Corporation's Model 6231. This particular model is designed to operate at 110 KVP and 3.5 ma. To maximize the X-ray absorption of the wafer, lower energy X-rays are desired. This can be achieved quite simply by lowering the X-ray plate voltage and increasing the current, and using a low absorption Berrylium window. Typically, the Picker model 6231 X-ray unit can operate at 50 KVP and 5 ma, with a Berrylium window (to minimize absorption through the tube), and release 3842 rads/minute 6 inches from the target (i.e., the metallic mask). Thus, the approximate irradiation time for the whole process would be roughly, 3 minutes.

An alternate method of providing the MOS wafer with approximately 10,000 rads (Si) of ionizing radiation is through the use of a radioisotope chamber having a CO–60 source or a CS–137 source. The latter, emitting gamma rays with energy of 0.662 Mev is more desirable due to its longer half life (30 years compared with 5.24 years for CO–60). In such a unit, the MOS wafer is placed in a chamber where typically using a small size CS–137 source, it will be exposed to 50,000 rads/hr., thus achieving the desired 10,000 rads in 12 minutes.

A third method of providing MOS FETS with 10 kilorads (Si) of ionizing radiation involves the use of a radioisotope emitting alpha particles (helium nuclei). The advantage of this method is that alpha particles being relatively quite massive and possessing a positive electric charge (+2) are quickly slowed down and absorbed by the silicon sample (MOS FETS), thus minimizing the radiation flux needed. Typically, only an alpha source emitting alpha particles with energy greater than 5 Mev should be used. A possible source is Am–241 with alpha energy of about 5.5 Mev and a half life of 458 years. Although the advantage of low flux requirement is significant, alpha sources have a great disadvantage associated with their use. The sources are obviously radioactive and are very difficult to work with compared to either an X-ray machine or a gamma source. In addition, the time for the required exposure could be quite long since high flux alpha exposure cannot be used. High flux alpha can cause serious surface damage due to the great degree of surface absorption. Therefore the preferred method would utilize either the X-ray or gamma source.

Figure 4:
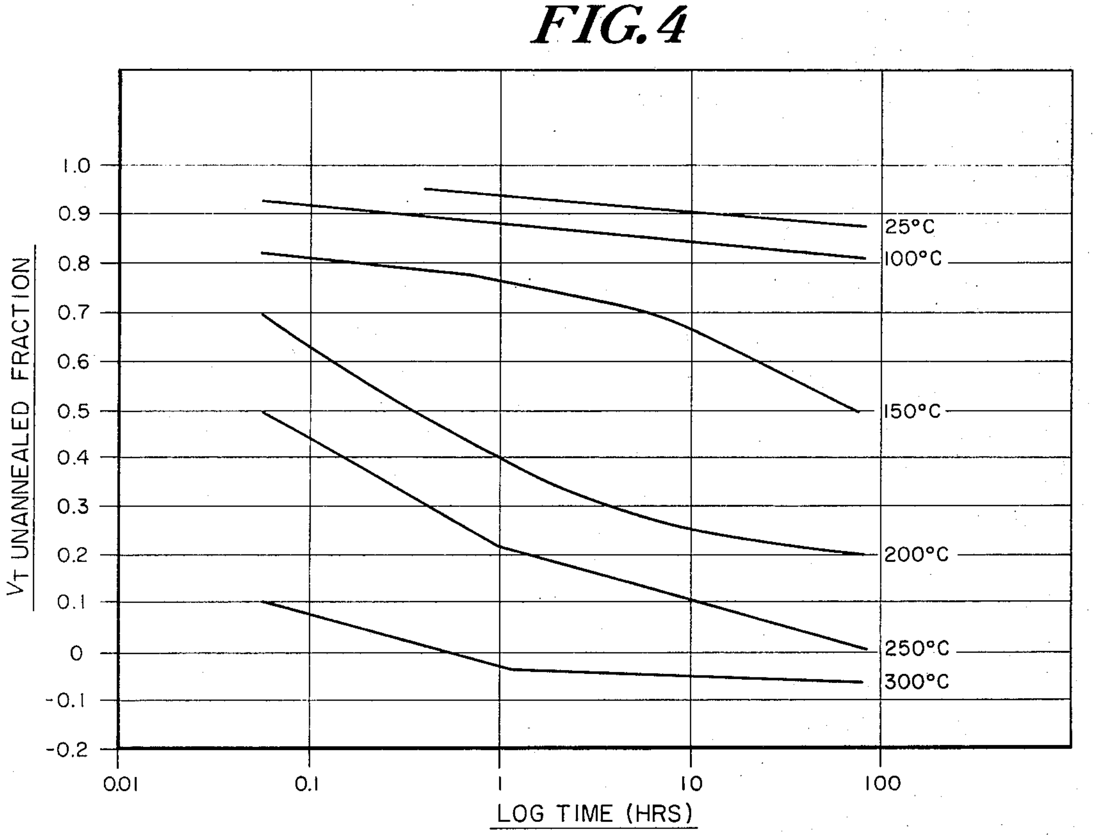
FIG. 4 is a graph showing annealing times and temperatures.

It has been shown that the radiation induced shift of $V_T$ in MOS FETS can be completely annealed by placing the completed MOS wafer in an oven controlled temperature of between 250° and 300°C. Reference is made, for example, to "Characteristics of Thermal Annealing of Radiation Damage in MOS FETS" by Danchenko and Desai, published in Volume 39, No. 5 of the Journal of Applied Physics (April, 1968). Thus, the changes in voltage threshold ($V_T$) which were induced by gamma radiation can be completely annealed as illustrated in FIG. 4 with the correct combination of temperature and annealing time. The best annealing temperature for complete recovery of the original $V_T$ is between 250° and 300°C. For example, a typical MOS device will completely anneal after being exposed to a temperature of 250° for 100 hours. At 300°C a complete anneal only takes 24 minutes. After the complete annealing occurs at 300°C, $V_T$ may shift beyond its original value (toward a more positive $V_T$). This is due to oxide passivation. A recommended anneal condition therefore is 280°C for 1 hour. It should also be mentioned that $V_T$ can be annealed by using B–T (bias temperature) techniques. This involves placing an opposite gate bias on the MOS device in addition to thermal anneal and will provide complete annealing of $V_T$ change within a short period (about 1 hour) at lower temperatures.

In any event, it will be appreciated that once the irradiated memory array is produced it can be completely annealed or thermally reset. Erasure of the original stored program is thus accomplished, and the same array may be re-irradiated with a new mask-pattern to form a completely new memory.

The operation of a MOS read-only-memory prepared in accordance with the present invention is similar to that of a conventional ROM. The main differences lie in the method of setting the storage pattern into the MOS substrate and the capability of completely resetting the array and setting it anew with a different pattern. The invention could, therefore, be used with any commercially available MOS devices such as p-channel, n-channel, and complementary MOS. The operation of all these devices, when used in a ROM, is basically the same. What follows will, therefore, be limited by way of example, to a description of the operation of a p-channel MOS-memory incorporating the features of the present invention.

Each MOS device when operating as the switch shown in FIG. 1C functions as a basic memory cell. It will be recalled from the drain current-gate voltage characteristic of FIG. 1B that when the negative going input pulse ($V_{IN}$) is larger in magnitude than $V_T$, current is caused to flow between source and drain. A current flow will be understood to correspond to a stored "one" while no current corresponds to a stored "zero."

The threshold voltage of a particular MOS-transistor is, as previously described, a function of whether it had been irradiated or not. The simultaneous application of a negative voltage to a set of transistors will cause current to flow only between the sources and drains of the transistors which were not irradiated. Thus, for example, turning to FIG. 5 wherein the asterisk represents an irradiated MOS transistor, the output of n transistors when pulsed simultaneously will be 101 . . . 0 as shown. The irradiated devices do not respond to the input because their threshold, increased by radiation, exceeds the applied gate voltage.

Figure 5:
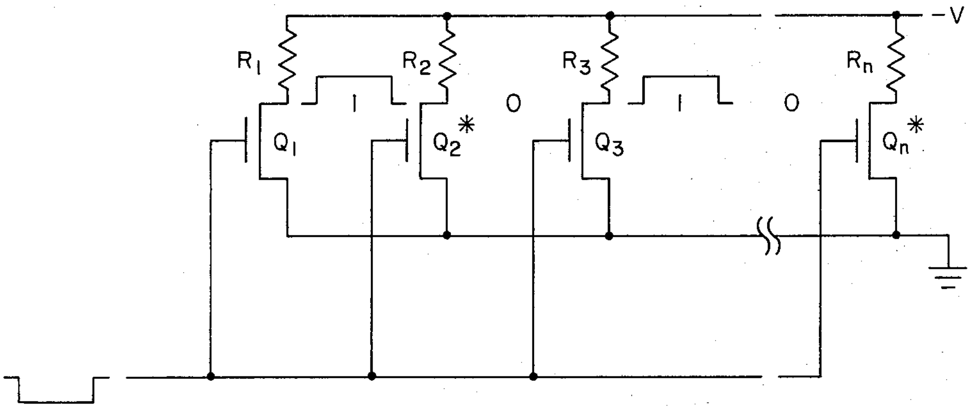
FIGS. 5 and 6 are electrical circuit diagrams showing the operation of the Read-Only-Memory prepared in accordance with the present invention.

The n transistors shown in FIG. 5 may represent n-bits of a particular word of a ROM. To build a memory of M-words m-such circuits must be built. All transistors corresponding to the same bit, must be joined together and connected into a common sense circuit. Thus, for n-bits n-sense circuits are required. Furthermore, word decoding circuitry must be added and combined with the basic storage cells to form a complete memory subsystem. The sense and word decoding circuitry can be constructed from either bipolar or from MOS devices. With bipolar peripheral circuitry higher speed of operation is possible. The advantages of MOS circuitry are lower cost and smaller volume since the storage cells and peripheral circuitry could be constructed in one step and on one substrate.

Figure 6:
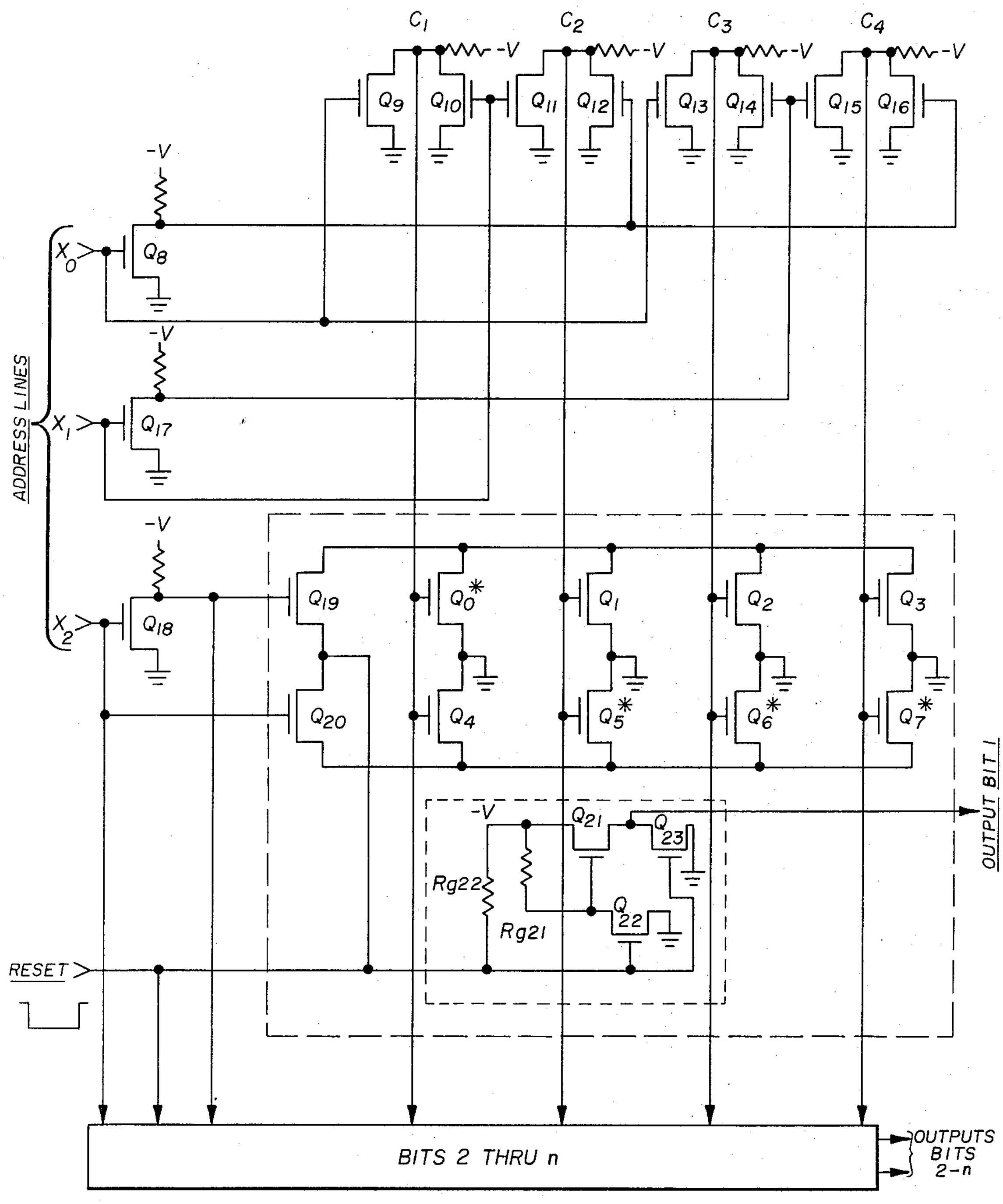

A MOS-ROM consisting of 8 words of n-bits/word is illustrated in FIG. 6. The same basic organization would also be applicable to memories of larger capacities. An eight word memory was chosen for illustration for the sake of clarity and ease of explanation.

In addition to the basic storage cells, $Q_0 - Q_7$, which store bit one of words $W_0 - W_7$ respectively, the memory also contains the necessary decoding and sensing circuitry. The latter is repeated for every bit of the memory while the decoding circuitry is common for all bits as illustrated in FIG. 6.

The pattern stored in memory depends on the number of irradiated MOS transistors. In our illustration $W_0$, $W_5$, $W_6$ and $W_7$ contain "zeros" in the bit one position (the other bits not shown) while all the others contain "ones." Thus, when the "zero" locations are interrogated or decoded the outputs on their corresponding output lines will be "zero," while the "one" locations will produce "one" outputs. This will presently be explained.

In the explanation to follow assume a negative transition (from ground to $-V$) to be a "one" and a positive transition (from $-V$ to ground) to be a "zero." Since the MOS memory illustrated in FIG. 6 consists of p-channel devices, a "one" applied to the gate of the device will turn it on while a "zero" will turn it off or keep it off. A turned on device will be assumed to have negligible drop across it.

Just prior to interrogation of the memory a negative reset pulse is applied to all sensing ciruits as shown. This essentially clears all the output lines to "zero." If a "one" transistor, such as $Q_1$, is decoded the output line will experience a negative transition while a decoded "zero" unit, such as $Q_7$, will produce no change.

The eight words of memory are organized in a 4 × 2 matrix; four columns and two rows as shown. To select one of the eight, one column and one row have to be selected. These in turn are decoded by the three bits of address information $X_2$, $X_1$, and $X_0$. $X_1$ and $X_0$ decode the 4 column drivers, $C_1 - C_4$, while the $X_2$ bit decodes the two row drivers, $Q_{19}$ and $Q_{20}$. The column driver when decoded applies a negative potential to the gates of the decoded words. The row driver in turn applies a negative voltage to the drains of the decoded words. Only the decoded MOS transistors will have simultaneous negative voltage on its gate and drain. This device will conduct current if it had not been previously irradiated. If, however, it had been irradiated the applied gate voltage is insufficient to turn it on. For example, $Q_1$, when decoded, will conduct while $Q_7$ will not.

To decode $Q_1$, which stores bit one of word one, the address lines $X_2$ and $X_1$ are high and $X_0$ is low (=001). The output of column driver $C_2$ will be at $-V$ since transistors $Q_{11}$ and $Q_{12}$ have been turned off. $Q_{19}$ will be on since $Q_{18}$ is off. Since $Q_1$ has not been irradiated, current will now flow from ground through $Q_1$, $Q_{19}$, and $R_{g22}$ into the negative supply V. The gates of $Q_{22}$ and $Q_{23}$ will, therefore, be approximately at 0 volts and $Q_{22}$ and $Q_{23}$ will be off and $Q_{21}$ will be on since its gate is now at $-V$ volts. The output from the sense circuit will also be at $-V$ volts corresponding to a "one." Thus, the "one" stored in $Q_1$ was read out.

Similarly to decode $Q_7$; $X_2$, $X_1$ and $X_0$ lines are negative (=111) and the output of $C_4$ driver will be negative and $Q_{20}$ will be on. However, since $Q_7$ had been irradiated it does not turn on and no path is established from ground to the $-V$ source. The gates of $Q_{22}$ and $Q_{23}$ remain negative and $Q_{23}$ remains on. The output remains at the "zero" level and the "zero" stored in the $Q_7$ location has been read out.

In view of the foregoing it should now be apparent that the present invention shares all the advantages of conventional MOS read-only-memories, yet enjoys the further advantage of being useable over and over again, without becoming obsolete. Re-use of the same MOS wafer significantly lowers the cost/bit since in successive applications where new and different programs are required, the cost of a new wafer is eliminated entirely. In addition, since no variations of the oxide layer is necessary as in prior art arrays—it is the radiation mask and not the wafer or the latter's interconnect mask which creates the memory-only one standard type MOS wafer is required for any custom memory. This maximizes the fabrication yield of such wafers resulting in further cost savings and moreover, in a significant increase in reliability.

We claim:

1. A read-only memory for storing information in binary bit form comprising a MOSFET wafer substrate containing a multiplicity of individual transistors, a selected number of said transistors being irradiated by a particular dosage of a particular radiation so that the threshold veoltages thereof are established at a different value than the threshold voltages of the remaining ones of said transistors; a sense circuit connected to said transistors for applying an input pulse to said transistors which is smaller in magnitude than the threshold voltages of said selected transistors, but which is larger in magnitude than the threshold voltages of said remaining transistors, so that a current is caused to flow in each one of said remaining transistors but no current is caused to flow in said selected transistors upon the application of said input pulse; individual output circuits connected to all said transistors in which output currents flow in response to said input pulse but only in those output circuits connected to said remaining transistors; and circuit means connected to said output circuits for sensing the current flow in each of said output circuits.

2. The read-only memory defined in claim 1, wherein said current flow sensed in each of said output circuits by said last-named circuit means corresponds to a stored binary "1" wherein the absence of a sensed current flow in each of said output circuits corresponds to a stored binary "0."

* * * * *